US007805249B2

(12) United States Patent
Summerfield et al.

(10) Patent No.: US 7,805,249 B2
(45) Date of Patent: Sep. 28, 2010

(54) METHOD FOR PERFORMING CONTROLLED SOURCE ELECTROMAGNETIC SURVEYING WITH MULTIPLE TRANSMITTERS

(75) Inventors: Philip J. Summerfield, Katy, TX (US); Dennis E. Willen, Houston, TX (US)

(73) Assignee: ExxonMobil Upstream Research Co., Houston, TX (US)

(*) Notice: Subject to any disclaimer, the term of this patent is extended or adjusted under 35 U.S.C. 154(b) by 320 days.

(21) Appl. No.: 11/990,960

(22) PCT Filed: Jul. 26, 2006

(86) PCT No.: PCT/US2006/029087

§ 371 (c)(1),
(2), (4) Date: Feb. 25, 2008

(87) PCT Pub. No.: WO2007/040743

PCT Pub. Date: Apr. 12, 2007

(65) Prior Publication Data

US 2009/0120636 A1     May 14, 2009

Related U.S. Application Data

(60) Provisional application No. 60/718,473, filed on Sep. 19, 2005.

(51) Int. Cl.
*G01V 1/40* (2006.01)
*G01V 3/18* (2006.01)

(52) U.S. Cl. .................................................... 702/11

(58) Field of Classification Search .................. 702/1, 702/2, 3, 4, 5, 6, 7, 8, 9, 10, 11, 12, 13, 14, 702/15, 16, 17, 18, 36, 38; 324/323, 328, 324/329, 336, 338, 339, 343, 347, 354, 359, 324/366, 371

See application file for complete search history.

(56) References Cited

U.S. PATENT DOCUMENTS

| 4,798,156 A | 1/1989 | Langeland et al. ............ 114/242 |
| 4,823,326 A | 4/1989 | Ward .............................. 367/41 |
| 5,715,213 A | 2/1998 | Allen ............................. 367/48 |
| 5,721,710 A | 2/1998 | Sallas et al. .................... 367/41 |

(Continued)

FOREIGN PATENT DOCUMENTS

EP          0519810       12/1992

(Continued)

OTHER PUBLICATIONS

Chave, et al. (1991) "Electrical Exploration Methods for the Seafloor," *Electromagnetic Methods in Applied Geophysics*, v.2, Soc. Explor. Geophys., pp. 931-966.

(Continued)

Primary Examiner—Aditya Bhat
(74) Attorney, Agent, or Firm—ExxonMobil Upstream Research Co. Law Dept.

(57) ABSTRACT

Method for separating responses of multiple transmitters in a controlled source electromagnetic survey by using mutually orthogonal transmitter waveforms and transforming the combined response to the frequency domain (144) The mutual orthogonality can be based disjoint frequency spectra or on phase encoding of a common waveform element (FIG. 14).

17 Claims, 8 Drawing Sheets

U.S. PATENT DOCUMENTS

| | | | |
|---|---|---|---|
| 5,822,269 A | 10/1998 | Allen | 367/41 |
| 5,924,049 A | 7/1999 | Beasley et al. | 702/17 |
| 6,332,109 B1 | 12/2001 | Sheard et al. | 702/11 |
| 6,813,566 B2 | 11/2004 | Hartley | 702/14 |
| 2009/0043508 A1* | 2/2009 | MacGregor et al. | 702/6 |

FOREIGN PATENT DOCUMENTS

| | | |
|---|---|---|
| GB | 2411006 | 8/2005 |
| WO | WO 03/034096 | 8/2003 |
| WO | WO 2004/008183 | 1/2004 |
| WO | WO 2004/053528 | 6/2004 |
| WO | WO 2005/081719 | 9/2005 |
| WO | WO 2005/117326 | 12/2005 |
| WO | WO 2006/088591 | 8/2006 |
| WO | WO 2007/046952 | 4/2007 |
| WO | WO 2008/008127 | 1/2008 |

OTHER PUBLICATIONS

Cox et al. (1986) "Controlled-Source Electromagnetic Sounding of the Oceanic Lithosphere," *Nature*, v.320.6, pp. 52-54.

Sheriff, R. E. (2002) "Encyclopedic Dictionary of Applied Geophysics," $4^{th}$ ed., pp. 31 & 275.

EP Search No. RS 113748 dated May 22, 2006 (1 page).

PCT International Search and Written Opinion dated Jan. 22, 2007 (8 pages).

* cited by examiner

METHOD FOR PERFORMING CONTROLLED SOURCE ELECTROMAGNETIC SURVEYING WITH MULTIPLE TRANSMITTERS

This application claims the benefit of U.S. Provisional Application No. 60/718,473 filed on Sep. 19, 2005.

FIELD OF THE INVENTION

This invention relates generally to the field of geophysical prospecting and, more particularly, to controlled source electromagnetic surveying. Specifically, the invention is a method for using multiple transmitters simultaneously.

BACKGROUND OF THE INVENTION

Controlled-source electromagnetic ("CSEM") surveys are an important geophysical tool for evaluating the presence of hydrocarbon-bearing strata within the earth. CSEM surveys typically record the electromagnetic signal induced in the earth by a source (transmitter) and measured at one or more receivers. The behavior of this signal as a function of transmitter location, frequency, and separation (offset) between transmitter and receiver can be diagnostic of rock properties associated with the presence or absence of hydrocarbons. Specifically, CSEM measurements are used to determine the spatially-varying resistivity of the subsurface.

In the marine environment, CSEM data are typically acquired by towing an horizontal electric dipole transmitting antenna 10 among a number of autonomous receivers 11 positioned on the seafloor 12 (FIG. 1). The receivers have multiple sensors designed to record different vector components of the electric and/or magnetic fields. The transmitter is typically towed 10-50 m above the seafloor. Alternative configurations include stationary transmitters on the seafloor (Constable, "System and Method for Hydrocarbon Reservoir Monitoring Using Controlled-source Electromagnetic Fields," WO 2004/053528A1) as well as magnetic transmitter antennae and vertical transmitters (Fielding and Lu, PCT patent application publication No. WO 2005/081719, "System and Method for Towing Subsea Vertical Antenna"; MacGregor et al., "Electromagnetic Surveying for Hydrocarbon Reservoirs," PCT patent publication No. WO 2004/008183). The transmitting and receiving systems typically operate independently (without any connection), so that receiver data must be synchronized with shipboard measurements of transmitter position and with the measured transmitter current waveform by comparing clock times on the receivers to time from a shipboard or GPS (Global Positioning System) standard.

CSEM data are typically interpreted in the temporal frequency domain, each signal representing the response of the earth to electromagnetic energy at that temporal frequency. Temporal frequency domain means the data is transformed, typically by Fourier transformation, such that the dependence of the data on time becomes dependence on frequency. In raw data, the strength of each frequency component varies depending on how much energy the transmitter broadcasts (i.e., the amplitude of each component in the transmitter's frequency spectrum) and on the receiver sensitivity at that frequency. These transmitter and receiver effects are typically removed from the data prior to interpretation. FIGS. 2A-B depict raw receiver data 21 together with the transmitter waveform 22 that gave rise to it. FIG. 2A displays measured data on a time scale of several hours while FIG. 2B shows the received signal (and, for reference, the transmitted signal) on a much shorter time scale, comparable to the transmitter signal period, typically between 4 and 32 seconds. (The vertical scale applies only to the receiver signal.)

In practice, the receiver data are converted to temporal frequency by dividing (or "binning") the recorded time-domain data into time intervals ($x_1$, $x_2$, and $x_3$ in FIG. 3A) equal to the transmitter waveform period (FIG. 3A) and determining the spectrum within each bin by standard methods based on the Fourier Transform (FIG. 3B). (The phases of the spectral components are not shown.) With each bin is associated a time, typically the Julian date at the center of the bin. Since the transmitter location is known as a function of time, these bins may be interchangeably labeled in several different ways: by Julian date of the bin center; by transmitter position; by the signed offset distance between source and receiver; or, by the cumulative distance traveled by the transmitter relative to some arbitrarily chosen starting point.

In general, the received signals are made up of components both in-phase and out-of-phase with the transmitter signal. The signals are therefore conveniently represented as complex numbers in either rectangular (real-imaginary) or polar (amplitude-phase) form.

More details of a typical marine CSEM transmitter are shown in FIG. 4. In addition to providing the forces needed to deploy and tow the transmitter, the tow cable 43 supplies power to the transmitter from the ship. That power is typically supplied at high voltage and low current to reduce ohmic losses in the tow cable, which may be several kilometers in length. The electric field generated in the earth is proportional to the transmitted current, so the transmitter 40 includes a step-down transformer to supply low-voltage, high-current power to the antenna electrodes 41 and 42. Taken together, the antenna electrodes and the wires connecting them form an electric dipole transmitting antenna, typically in the range of 100 to 300 meters in length. In typical operation, the antenna injects 800-1000 amperes of current at 100 Volts or less.

The transmitter signal may be a more complex waveform than the square wave depicted in FIGS. 2 and 3. For example, the tripeak waveform shown in FIGS. 5 and 6 is designed to generate roughly equal amplitudes for the fundamental frequency, the second harmonic, and the fourth harmonic (X. Lu and L. J. Srnka, "Logarithmic Spectrum Transmitter Waveform for Controlled-Source Electromagnetic Surveying," PCT Patent Application Publication No. WO/2005/117326). The switching times referenced in FIG. 5 for the tripeak waveform are as follows, in fractions of the period T: T0=0; T1=$18/256$; T2=$60/256$; T3=$67/256$; T4=$110/256$; T5=$147/256$; T6=$186/256$; T7=$198/256$; T8=$237/256$; and T9=1. The waveform is typically repeated after the indicated period, T, resulting in a fundamental frequency 1/T. The switching times, T1, T2, etc., are conveniently chosen for a transmitter operating at a 256 Hz carrier frequency. The amplitude depends on the amount of current the transmitter can deliver. FIG. 6 shows the frequency domain amplitudes of the tripeak waveform shown in FIG. 5. Most of the source energy appears at frequencies 1/T, 2/T, and 4/T Hz. Other peaks (7/T, 10/T, 14/T, . . . ) also contain useful amounts of signal. The very small peaks (3/T, 5/T, 8/T, . . . ) do not typically generate a usable response in the earth. By contrast, a square waveform has no amplitude at the even harmonics while the amplitudes of its odd harmonies are proportional to 1/N, where N is the number of the harmonic.

The transmitter described in FIG. 4 may include electronic components to rectify or polarity-flip the sinusoidal current supplied from the ship to produce waveforms having the desired frequency and amplitude characteristics. Waveform-generation techniques are described, for example, in Chave, et al, "Electrical exploration methods for the seafloor," in

*Electromagnetic Methods in Applied Geophysics*, Volume 2, M. Nabighian (ed), Soc. Explor. Geophys., Tulsa, 931-966 (1991); Cox, et al, "Controlled source electromagnetic sounding of the oceanic lithosphere," *Nature*, 320, 52-54 (1986); and Sinha and MacGregor, PCT patent publication WO 03/034096A1. In general, these techniques operate by variously withholding current from the transmitter antenna, directing a half-cycle of the input to the antenna, or directing a half-cycle of the input to the antenna with reversed electrical polarity. This method is very effective at approximating low-frequency waveforms (for example, 32 Hz and below) from inputs with a relatively high carrier frequency (for example, 256 Hz and above). As an aid to understanding the method, FIG. 7 shows how a 0.5 Hz tripeak waveform might be composed from input current at a carrier frequency of 16 Hz. The 16 Hz carrier is for illustration only; a much higher frequency is typically used. In practice, capacitive effects in the transmitter smooth out the high-frequency sinusoidal ripples to some degree.

Among the problems currently hampering CSEM surveying are the following:

lowering the cost of CSEM surveys by reducing the time spent operating sources and receivers;

minimizing the time spent acquiring data in the field to overcome constraints imposed, for example, by acceptable weather, fishing seasons, or vessel traffic around production facilities (CSEM surveys are typically, but not necessarily, conducted in a marine environment);

improving the quality (signal-to-noise ratio) of CSEM data by increasing the total electromagnetic signal injected into the earth; and, improving the resolution of CSEM data by increasing the range of spatial and temporal frequencies that can be effectively transmitted into the earth.

Some current measures to mitigate these problems are discussed in the following paragraphs.

The leasing and operation of the survey vessel is a significant part of the total cost of marine CSEM surveys. While the exact percentage will vary from survey to survey, the time spent operating the transmitter can easily account for more than half of the survey cost. To transmit as much signal as possible into the subsea sediments, the antennae is typically towed at an elevation of 50 meters or less above the seafloor. To navigate the antenna safely and effectively at this elevation while maintaining acceptable spatial resolution, it must be towed at relatively low speeds—typically 2 knots ($\approx$1 m/s) or less—so that long tow lines can require up to a full day to carry out.

The total electromagnetic signal injected into the earth is a key factor in determining the size and depth of hydrocarbon accumulations that may be identified using CSEM data. Noise levels measured by the receivers will vary from survey to survey, and some data processing methods are available to help decrease this noise, but the ability to detect the earth's response to injected signals is ultimately limited by this noise floor. The most direct way to boost signal up above noise is to increase the dipole moment of the transmitter (injected current times antenna length). The antenna length is constrained by the capabilities of the launch and recovery equipment on the vessel and the need to keep the antenna neutrally buoyant. A more direct method to increase the dipole moment is to increase the injected transmitter current.

As is well known from the theory of Fourier Analysis and skin depth considerations, the ability to resolve individual geologic features with a CSEM survey is enhanced by the addition of more temporal frequencies to the transmitter waveform and by occupying more spatial locations with the transmitter. The range of temporal frequencies in use is known as the source bandwidth.

As previously discussed, Lu and Srnka custom-designed the transmitter waveform in order to more efficiently spread the available transmitter current among the most important frequencies. Their tripeak waveform is a sequence of transmitter waveforms that balances the current amplitude at three chosen frequencies.

Processing methods, such as subtracting noise estimated at non-transmitted frequencies (Willen, "Estimating Noise at One Frequency by Sampling Noise at Other Frequencies," PCT international patent application PCT/US06/01555, filed on Jan. 17, 2006) and stacking have been used to mitigate noise in CSEM data.

Workers in the field of marine seismic exploration have made use of multiple seismic sources towed from a single vessel and of sources towed from multiple vessels. See, for example, FIG. 4 of U.S. Pat. No. 5,924,049 to Beasley et al., "Methods for Acquiring and Processing Seismic Data." The immediate impact of using multiple sources is to achieve better spatial resolution of the subsurface by occupying a broader distribution of source locations without significantly increasing the time spent acquiring data. Beasley et al. further disclose a method of energizing more than one source at the same time in order to minimize the cost of the additional spatial resolution. Their method is to reconstruct the data that would have been acquired had the sources been energized separately in time. They disclose methods of reconstructing such data based on the "dip" of seismic events (the slope of seismic arrivals functions of the offset between source and receiver) from different sources. See also UK Patent Application GB 2,411,006 filed Feb. 16, 2004, naming inventors MacGregor, et al., titled "Electromagnetic Surveying for Hydrocarbon Reservoirs."

In the field of land seismic acquisition, U.S. Pat. No. 4,823,326 to Ward groups vibrator sweep signals into sets of four or more sweeps and introduces a phase factor to be applied to each sweep in the set. By appropriately selecting these phase factors, Ward can arrange to recover the data that would have been acquired separately by two or more vibrator sources from data collected while the sources were operated simultaneously. Ward's technique involves correlating vibrator data with pilot signals, which produces time-domain seismic data.

A series of patents to Allen and others address the problem of separating the seismic responses (acoustic waves) of two or more simultaneously operating vibratory sources. U.S. Pat. No. 5,822,269 discloses a method for separating and pre-processing vibratory source data by varying the phase of the vibratory sources according to two patterns. U.S. Pat. No. 5,715,213 discloses a method for recording and pre-processing high fidelity vibratory seismic data that includes the steps of measuring the motion of the vibrator which is related to the vibrator applied force times a transfer function of minimum phase, causal, linear system relating the actual vibrator output with the measured vibrator motion, and separation of signals according to generating source. U.S. Pat. No. 5,721,710 discloses a method of separating the effects of the earth response on vibratory energy from individual ones of multiple vibrators as detected by geophones in the course of a seismic survey.

While the objectives of any particular survey and the conditions encountered near the seafloor may provide some flexibility, there are limits to what can be done toward saving time by towing the transmitter more rapidly, since faster tow speeds make it more difficult to control the transmitter's elevation above the seafloor.

Considerable power-generation capacity can be made available on the tow ship, but the overall current available to the antenna is limited by physical size of the tow cable. Using a larger tow cable would mean using larger hoists to deploy the cable and larger winches to direct the transmitter motion through the heavier cable. An even more serious problem would be keeping a larger tow cable cool enough to avoid damage while on its take-up reel.

Processing methods such as stacking address the issue of increasing signal-to-noise ratio but only impact the survey cost or resolution in so far as these criteria both depend on signal-to-noise ratio. In general, data acquisition techniques that address the above-identified problems can be practiced together with a variety of processing techniques that increase signal-to-noise ratio.

In order to reconstruct the data that would have been acquired by separate (non-simultaneous) source excitations, Beasley et al. must have a significant physical separation of the sources such as positioning a source at either end of a marine streamer containing the receivers. Only by having this physical separation and relatively high bandwidth (compared to CSEM surveys) can they establish the offset versus time trajectories (their FIGS. 12 through 18) needed to separate the data from each source by means of multi-channel, f-k, or Radon filtering techniques. They must employ a filtering technique that is sensitive to these trajectories.

Ward recognizes the opportunity to phase-encode separate vibrator sweeps within a time-sequential set of sweeps. However, vibrator sweeps have a continuous frequency spectrum quite unlike the discrete CSEM source spectra typified by FIG. 6. As a result, vibrator sweep sets must include a minimum of four sweeps in order to separate the data from two vibrators. Still larger sweep sets are required in order to employ more vibrators.

SUMMARY OF THE INVENTION

In one embodiment, as indicated by the flow chart of FIG. 14, the invention is a method for performing a controlled source electromagnetic survey of a subterranean region using two or more electromagnetic transmitters such that the combined responses at a receiver can be separated according to transmitter, comprising: (a) selecting or constructing N mutually orthogonal waveforms, one for each of the N transmitters, where N=2 or more (Step 141); (b) energizing each transmitter to repetitively transmit its waveform, all transmitters transmitting at the same time (Step 142); (c) recording a combined electromagnetic response to the multiple concurrent transmissions at one or more receivers (Step 143); and (d) delivering the recorded combined response data for processing to separate the data by binning the data on a predetermined time interval and then transforming the data, bin-by bin, to the frequency domain, the bin time interval being determined by said waveforms' periodicities (Step 144).

Waveform mutual orthogonality is based on one of the following or a combination of both:

(i) waveforms are chosen that have no common frequencies with non-negligible associated amplitudes in their frequency spectra, using a predetermined criterion for negligible (Step 140A);

(ii) waveforms are constructed from repetition of a selected waveform element with one or more predetermined phase shifts applied to the selected element, said phase shifts being chosen such that when combined data are binned on a selected time interval then transformed bin-by bin to the frequency domain, data from each transmitter can be separated by virtue of the phase shifts, said selected bin time interval being a selected integer (at least two) multiple of the waveform element's duration (Step 140B).

BRIEF DESCRIPTION OF THE DRAWINGS

The present invention and its advantages will be better understood by referring to the following detailed description and the attached drawings in which.

The invention will be described in connection with its preferred embodiments. However, to the extent that the following detailed description is specific to a particular embodiment or a particular use of the invention, this is intended to be illustrative only, and is not to be construed as limiting the scope of the invention. On the contrary, it is intended to cover all alternatives, modifications and equivalents that may be included within the spirit and scope of the invention, as defined by the appended claims.

DETAILED DESCRIPTION OF THE PREFERRED EMBODIMENTS

The present invention is a method for simultaneous use of multiple electromagnetic transmitters in a CSEM survey. The simultaneous transmissions are enabled through the use of orthogonal waveforms so that the data that would have been acquired from separate transmissions can be recovered during data processing.

There are three ways to construct orthogonal waveforms suitable for this invention:

1) Individual waveforms can be chosen so that the significant frequencies in their spectra do not overlap. That is, waveforms are chosen that do not have any frequencies in common or whose common frequencies are so weak as to be irrelevant. This approach may be identified by the term "disjoint spectra."

2) Waveform sets can be made from a series of waveforms in time with predetermined phase shifts applied to the individual waveforms within a set. By processing the entire waveform sets and properly accounting for the phase shift factors, the data that would have been acquired from the individual sources can be recovered. This approach may be identified by the term "phase encoding."

3) A combination of methods (1) and (2) by which some transmitter broadcast waveforms that are orthogonal by virtue of their frequency spectra while other transmitters broadcast waveform sets that are orthogonal as a result of their phase factors.

Figure 3A:
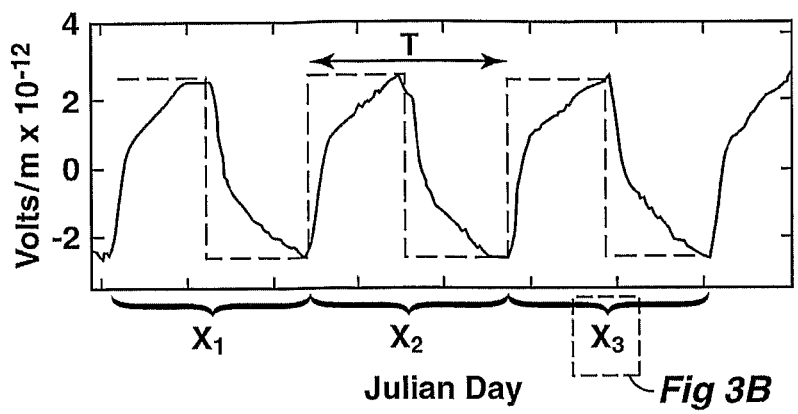
FIGS. 3A-B illustrate the process of binning a receiver signal in time and determining the frequency spectrum within each time bin by Fourier analysis.
Figure 3B:
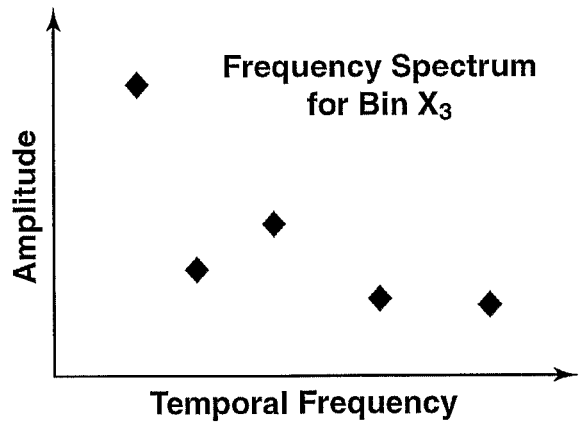
Figure 4:
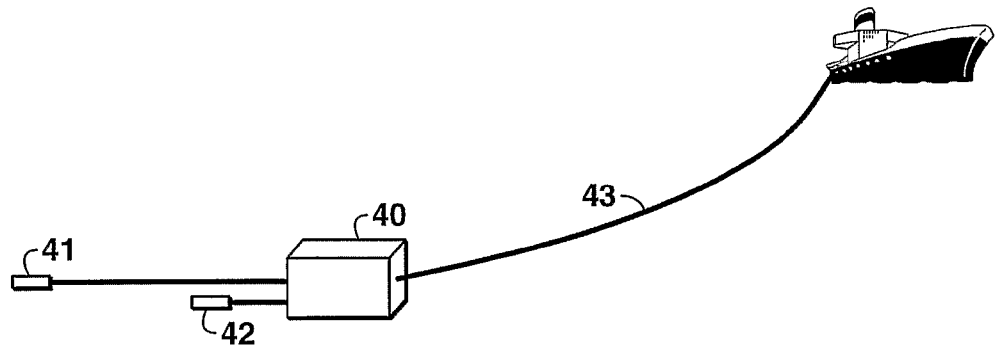
FIG. 4 shows some details of a marine CSEM source.
Figure 8A:
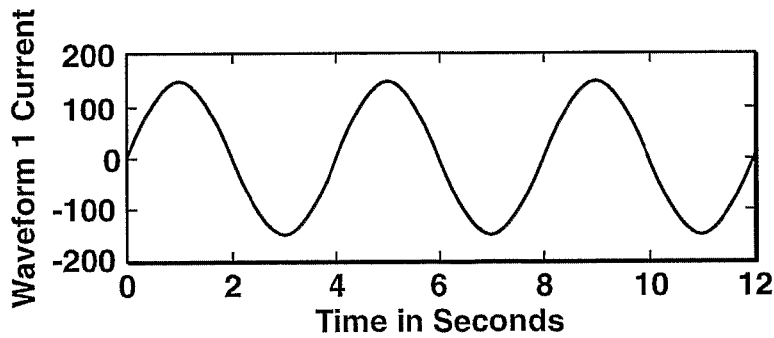
FIGS. 8A-B show an example of two waveforms suitable for the present invention and that are orthogonal by virtue of having no common frequencies in their frequency spectra, each spectrum in this particular example containing a single frequency.
Figure 8B:
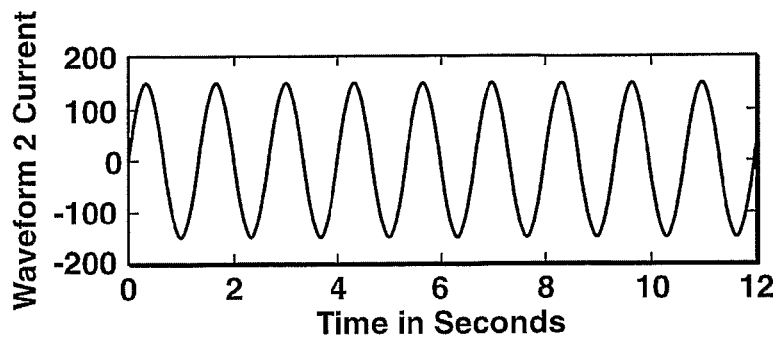

FIGS. 8A-B show an example of disjoint spectra where one transmitter is broadcasting a ¼ Hz sine waveform (FIG. 8A) and the second transmitter is simultaneously broadcasting a ¾ Hz sine waveform (FIG. 8B). When the data from these waveforms are binned at 4-second (or a multiple of 4 seconds) intervals, the spectral decomposition (Fourier analysis) step indicated in FIGS. 3A-B will produce two amplitudes corresponding to the data that would have been acquired had the transmitters been operated separately.

Figure 9A:
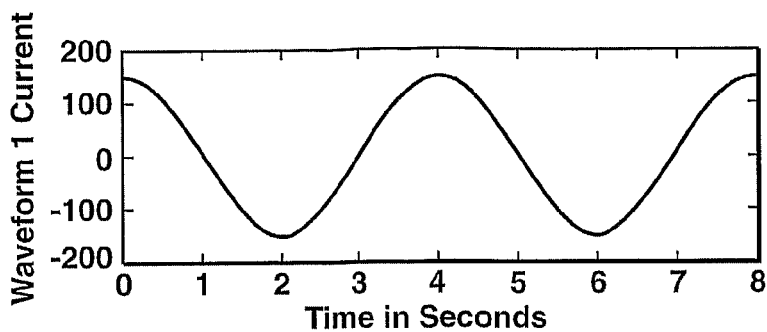
FIGS. 9A-B show an example of two waveforms suitable for the present invention and being orthogonal to each other by virtue of being constructed from the same waveform element (a single cycle of a sinusoid of period 4 seconds), with an appropriate phase shift applied to the elements comprising the waveform in FIG. 9B.
Figure 9B:
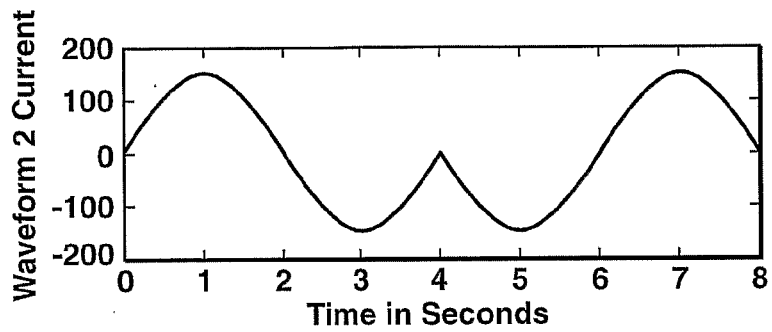

FIGS. 9A-B show an example of phase encoding where waveform sets have been constructed by appending two waveforms. FIG. 9A shows two consecutive, ¼ Hz cosine waveforms. FIG. 9B shows two consecutive, ¼ Hz sine waveforms, with a phase shift of 180° applied to the second waveform in the set. When data resulting from these two sources are binned at 8-second (or 16-second, 24-second, etc.) intervals, the spectral decomposition step will recover the data corresponding to the FIG. 9A source signal and cancel the data corresponding to the FIG. 8B source signal. This happens because every other waveform in the FIG. 9B signal has been multiplied by a factor of −1, corresponding to a phase shift of 180°. Alternatively, if this phase factor is first removed from the data by multiplying every other 4-second interval by −1, then the spectral decomposition step using an 8-second bin will cancel the data corresponding to the top transmission and recover the data for the bottom transmission.

Figure 10A:
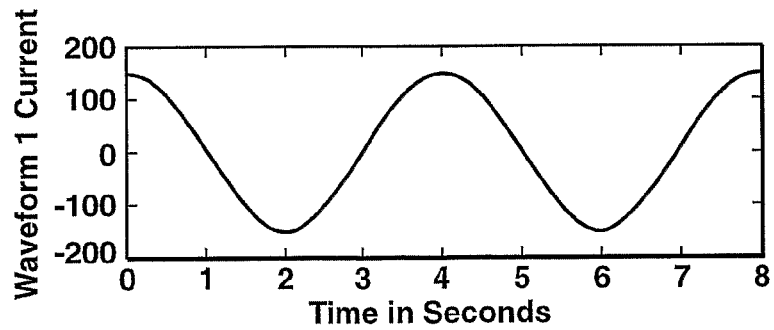
FIGS. 10A-B show an example of two waveforms that are not suitable for the present invention.
Figure 10B:
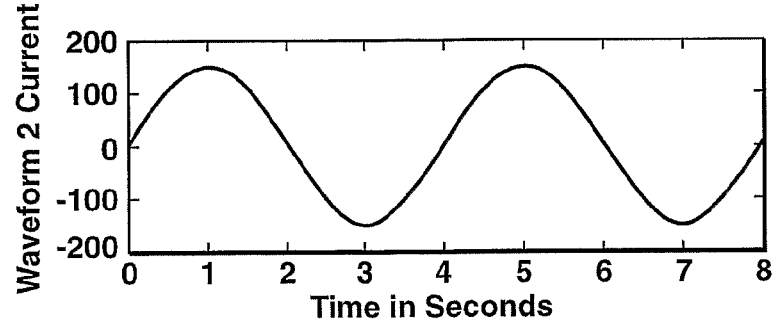

It is not possible to use the same frequency in each of two or more orthogonal waveforms without employing phase factors in combination with waveform sets. FIG. 10A (a ¼ Hz cosine wave) and FIG. 10B (a ¼ Hz sine wave) show two waveforms that cannot be employed for simultaneous transmission. Because of both its resistive nature and its non-uniformity, the earth's response to electromagnetic waves contains components which are both in-phase and out-of-phase with the source. Therefore, when data resulting from simultaneous use of both source signals are spectrally decomposed on 4-second (or 8-second, or 12-second, etc) bins, the out-of-phase data from the FIG. 10A (cosine) transmitter is indistinguishable from the in-phase data from the FIG. 10B (sine) transmitter. Similarly, the out-of-phase data from the FIG. 10B waveform will be irrecoverably entwined with the in-phase data from the FIG. 10A waveform.

Figure 1:
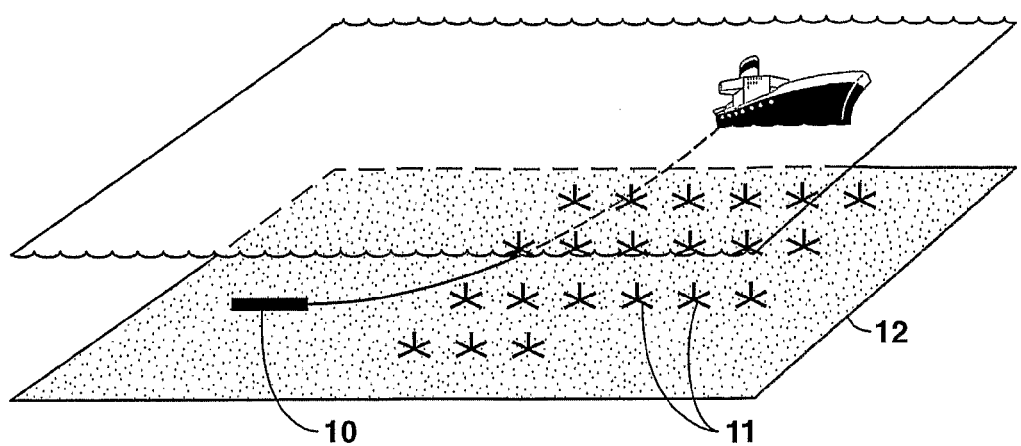
FIG. 1 shows a typical deployment of equipment in a marine CSEM survey.
Figure 2A:
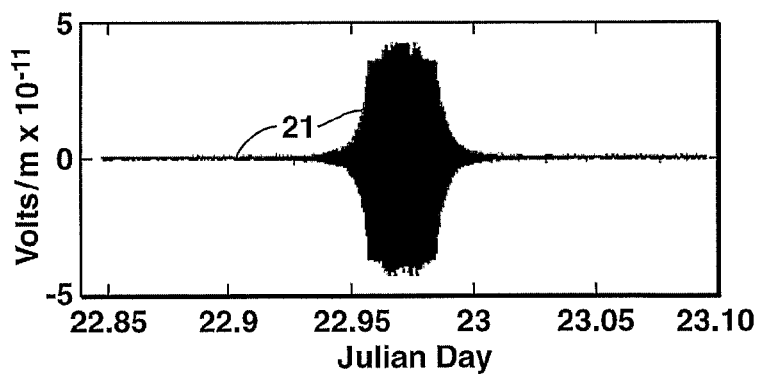
FIGS. 2A-B show examples of received CSEM signals.
Figure 2B:
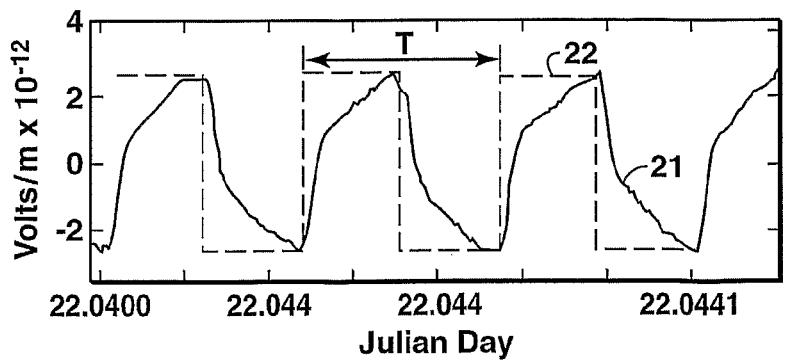

FIGS. 1A-C show an example using Method (3) that is suitable for exciting three transmitters simultaneously. The waveform set for each figure is 8 seconds in length and the individual waveforms are either 4 seconds (waveforms A and C) or ⁴⁄₃ seconds (waveform B). Waveform sets A and B are orthogonal by virtue of their disjoint frequency spectra as are waveform sets B and C. Waveform sets A and C are orthogonal by virtue of the 180° phase factor applied during the second half of waveform set C.

An individual transmitter waveform can be written as $$\sum_f A(f)\sin(2\pi ft) + \sum_f B(f)\cos(2\pi ft)$$

where f is frequency, t is time, and A and B express the portion of the transmitter current present at each frequency. This form of a Fourier series expansion, however, is inconvenient for CSEM data processing purposes. As described previously, the earth's response to a transmitted CSEM signal contains two components: a response that is in-phase with the transmitted signal and a response that is out-of-phase with the transmitted signal. Thus, if the transmitted signal were to consist entirely of a cosine function, the response would consist of both cosine and sine functions. Conversely, if the transmitted signal were to consist entirely of a sine function, the response would consist of both sine and cosine functions. So that the CSEM data processor can straightforwardly recognize both the in-phase and out-of-phase components of the earth response, it is convenient to define $$\tan(\phi) = -\frac{A(f)}{B(f)}$$
$$C(f) = \sqrt{A^2(f) + B^2(f)}$$

and write an individual transmitter waveform as $$\sum_f A(f)\sin(2\pi ft) + \sum_f B(f)\cos(2\pi ft) =$$
$$-\sum_f \sqrt{A^2+B^2}\sin(\phi)\sin(2\pi ft) + \sum_f \sqrt{A^2+B^2}\cos(\phi)\cos(2\pi ft) =$$
$$\sum_f \sqrt{A^2+B^2}\cos(2\pi ft+\phi) = \sum_f C(f)\cos(2\pi ft+\phi)$$

A sequence of consecutive waveforms (a "waveform set") may then be written as $$\sum_f W_m^n(f)\cos(2\pi ft + \phi_{nm}) \qquad (1)$$

where n labels the waveform set itself, and m labels an individual waveform within the set. This expression represents the Fourier expansion of the entire waveform set, and the W are the expansion coefficients, or alternatively may be considered to be the waveform amplitude in the frequency domain. Persons skilled in the art will know how to calculate the Fourier series coefficients for a given function of time, i.e., source signal waveform. W is non-zero only at specific values of f for waveforms of interest in the present invention. For example, the amplitude of a square waveform is non-zero at frequencies $f_0$, $3f_0$, $5f_0$, $7f_0$, ... where $1/f_0$ is the period of the square wave. The phase factor applied to the $m^{th}$ waveform in the $n^{th}$ set is $\phi_{nm}$. The entire waveform set is presumed to span a time T after which it repeats. As another example, the expansion of the waveform of FIG. 8A will have only a single term with f=¼ Hz and $\phi=-\pi/2$, i.e., W(f) will be zero for all frequencies but ¼ Hz, where it will equal 150 (the amplitude of the cosine wave). There is only one waveform in this set. The waveform set of FIG. 9B is an example where there are two waveforms in the set. For waveform m=1, the phase shift $\phi=-\pi/2$, but for m=2, $\phi=\pi$. Both $W_1(\frac{1}{4})$ and $W_2(\frac{1}{4})=150$ Amps for this example. As a further example, for the tri-peak waveform of FIG. 5, the W(f) values may be read from the vertical axis of FIG. 6.

The term "waveform set" (as opposed to the individual waveform within the set) is used herein and defined above. This terminology is useful for describing phase-encoded orthogonal waveforms, being constructed as they are of a sequence of phase encoded "individual waveforms." This terminology has no particular added value as applied to source signals that are orthogonal because of disjoint spectra. Accordingly, in the appended claims, in an effort to use more self-explanatory terminology, this terminology (waveform set/individual waveform) is replaced by "waveform" and "waveform element." Thus, for the phase-encoded transmitter waveforms of FIGS. 9A-B, the waveform element is a single cycle of a ¼ Hz sinusoid. Each source waveform is constructed from two phase-shifted (phase shift may be zero) waveform elements. For the disjoint spectra example source signals of FIGS. 8A-B, the sinusoids shown are the "waveform" and there is no separate waveform "element." Alternatively, the waveform and the waveform element can be considered synonymous for the disjoint spectra case. The waveform (waveform set) is a unit of signal that is repeated by each of the multiple CSEM sources in the present invention.

Different methods of spectral decomposition (transformation to the frequency domain and separation by transmitter) vary in detail, but the receiver data associated with the $i^{th}$ waveform set (that is, the $i^{th}$ transmitter) can be generally extracted (for source waveform sets according to the present invention) by carrying out the weighted Fourier transform.

$$D^i_{in\text{-}phase}(f) = \frac{2}{T}\int_0^T dt \tilde{W}^i_j(f)\cos(2\pi ft + \phi_{ij})D(t) \quad (2)$$

$$D^i_{out\text{-}of\text{-}phase}(f) = \frac{2}{T}\int_0^T dt \tilde{W}^i_j(f)\sin(2\pi ft + \phi_{ij})D(t)$$

where D(t) is the receiver data as acquired in the time domain with all N transmitters active, $D^i$ is the data at frequency f that would have been acquired from any one transmitter in operation by itself, and $\tilde{W}^i_j(f)=W^i_j(f)^{-1}$ where W is non-zero and $\tilde{W}^i_j(f)=0$ elsewhere. Thus, the Fourier transformation of the electromagnetic data to the temporal frequency domain must be done by numerical methods using a computer. However, this computation does not need to be done for all frequencies because the transmitter signals have been designed such that they will have only a few frequencies with significant associated amplitudes in their frequency spectrum, and this can be expected to be reflected in the measured data as well. So, in practice, i.e., in preferred (but not all) embodiments of the present invention, the transformation of the data to the frequency domain reduces to calculating the Fourier coefficients for the Fourier expansion of the data at just those frequencies at which a significant non-zero expansion coefficient can be expected. The $\tilde{W}$ term provides source normalization to the results. For the example of the two transmitter signals of FIGS. 8A-B, one knows to perform the above integration at just the two frequencies, ¼ Hz and ¾ Hz, and the two results will be the two source-separated responses in the frequency domain. (Each separated response can then be inverse-transformed to yield separated time-domain data if desired). The integral above would be computed (for the case of the two transmitter signals of FIG. 8A-B) over the first four seconds of data collection, then again over the next four seconds, and so on to compute the frequency spectrum at consecutive time bins. Also, $\tilde{W}(\frac{1}{4})=\frac{1}{150}$ and $\phi=0$ for this example.

In an alternative method of spectral decomposition, receiver data acquired from the transmitter waveform set in expression (1) may be decomposed by a process of fitting the data, such as (but not limited to) by least-squares. To understand decomposition by data fitting, note that the receiver waveform must be periodic with period T and may be written as $$D(t) = \sum_f A(f)\sin(2\pi ft) + \sum_f B(f)\cos(2\pi ft).$$

To extract the in-phase receiver frequency spectrum by means of a least-squares fit, one may sum over time values and find $$\min \frac{1}{T}\int_0^T dt \left[ C(f)W^n_m(f)\cos(2\pi ft + \phi_{nm}) - \sum_f A(f)\sin(2\pi ft) - \sum_f B(f)\cos(2\pi ft) \right]^2$$

To minimize this function, one differentiates it with respect to C and sets the result to zero:

$$0 = \frac{\partial}{\partial C}\frac{1}{T}\int_0^T dt \left[ \begin{array}{c} C^2(f')W^n_m(f)^2\cos^2(2\pi ft + \phi_{nm}) - 2C(f') \\ W^n_m(f)\cos(2\pi ft + \phi_{nm})\sum_f \left\{ \begin{array}{c} A(f)\sin(2\pi ft) + \\ B(f)\cos(2\pi ft) \end{array} \right\} + \\ \text{terms independant of } C \end{array} \right] =$$

$$C(f')W^n_m(f)\frac{1}{T}\int_0^T dt\cos^2(2\pi ft + \phi_{nm}) -$$

$$\frac{1}{T}\int_0^T dt\cos(2\pi ft + \phi_{nm})\sum_f \left\{ \begin{array}{c} A(f)\sin(2\pi ft) + \\ B(f)\cos(2\pi ft) \end{array} \right\} =$$

$$\frac{1}{2}C(f)W^n_m(f) - \frac{1}{T}\int_0^T dt\cos(2\pi ft + \phi_{nm})\sum_f \left\{ \begin{array}{c} A(f)\sin(2\pi ft) + \\ B(f)\cos(2\pi ft) \end{array} \right\}$$

so that $$C(f) = \frac{2}{T}\int_0^T dt\tilde{W}^n_m(f)\cos(2\pi ft + \phi_{nm})\sum_f \left\{ \begin{array}{c} A(f)\sin(2\pi ft) + \\ B(f)\cos(2\pi ft) \end{array} \right\}$$

the same result as the in-phase component of equations (2). Conversely, to extract the out-of-phase receiver frequency spectrum by means of a least-squares fit, one would determine $$\min \frac{1}{T}\int_0^T \left[ E(f)W^n_m(f)\sin(2\pi ft + \phi_{nm}) - \sum_f A(f)\sin(2\pi ft) - \sum_f B(f)\cos(2\pi ft) \right]^2$$

giving the same result as the out-of-phase component of equations (2):

$$E(f) = \frac{2}{T}\int_0^T dt \tilde{W}_m^n(f)\sin(2\pi ft + \phi_{nm})\sum_f \left\{ \begin{array}{l} A(f)\sin(2\pi ft) + \\ B(f)\cos(2\pi ft) \end{array} \right\}$$

Persons skilled in the art will understand that spectral decomposition by data fitting can be thought of as a way of transforming the data to the frequency domain. As a practical matter, spectral decomposition is typically computer implemented, i.e., performed with the aid of a computer.

It may be observed that equations (2) can be understood as using the inverse (reciprocal) of the (non-zero) terms in the Fourier expansion, i.e., expression (1), of the theoretical transmitter signal in the integral to extract the receiver data corresponding to that frequency. Instead of using the theoretical signal in this respect, in some embodiments of the present invention the actual transmitted waveform is measured, and the inverse of the measured waveform is used in equation (2). The actual transmitted signal can vary somewhat from the theoretical signal because of factors such as the limitations of the signal generator and shorts in the transmitter antenna. The results of this approach are slightly different values for expansion coefficient W and phase factor $\phi$. The measurement of the actual transmitted signal can be performed with a receiver such as one of the survey receivers. However, the receiver should be located close to the transmitter so that the measured response is unaltered by transmission through surrounding media.

To be usable as simultaneous CSEM waveform sets, all of the sets must be mathematically orthogonal to each other and to their quadrature or out-of-phase versions. That is, for any two distinct waveform sets i and k taken from among N orthogonal sets, it must both be true for all j and l waveform components that $$\int_0^T dt \sum_f \tilde{W}_j^i(f)\cos(2\pi ft + \phi_{ij})W_l^k(f)\cos(2\pi ft + \phi_{kl}) = 0 \quad (3)$$

and that $$\int_0^T dt \sum_f \tilde{W}_j^i(f)\sin(2\pi ft + \phi_{ij})W_l^k(f)\cos(2\pi ft + \phi_{kl}) = 0 \quad (4)$$

where $1 \leq i$, $k \leq N$ and $i \neq k$. Equation (3) comes from simple mathematical orthogonality of the waveform sets and equation (4) from ensuring that both the in-phase and out-of-phase earth responses can be extracted from the data. From these equations, it is clear that the waveform sets may be orthogonal either because the W's do not share frequencies or because the $\phi$-values have been selected to force the integrals over time to zero.

Figure 12A:
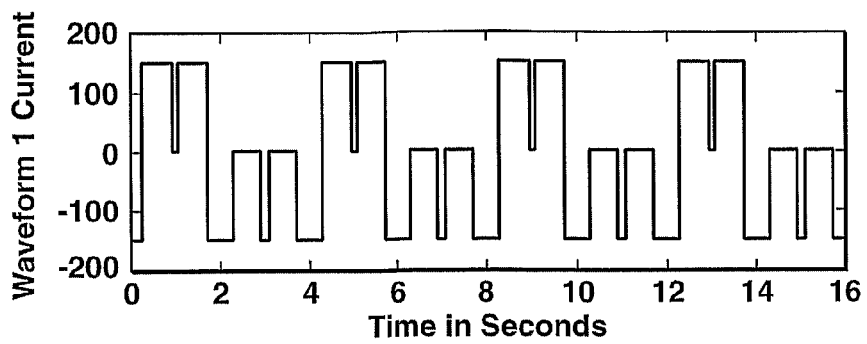
FIGS. 12A-B show an example of two non-sinusoid waveforms that are orthogonal by virtue of disjoint spectra, i.e., no common frequencies in their frequency spectra.
Figure 12B:
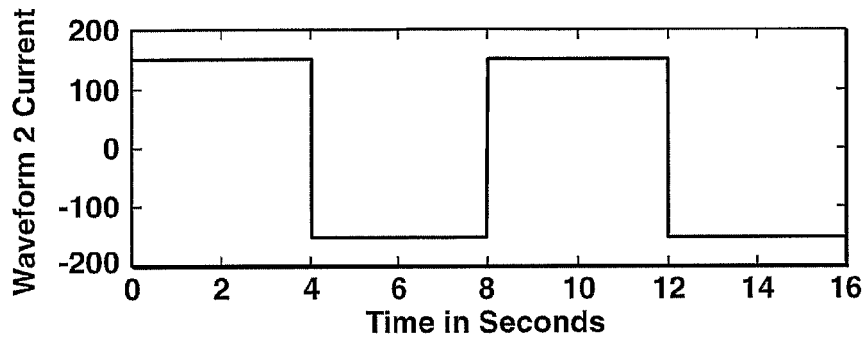

FIGS. 12A-B and 13A-B show two more examples of orthogonal waveform sets created from square and tripeak waveforms. FIG. 12A shows four cycles of the tri-peak waveform, and FIG. 12B shows two cycles of a square wave. The tri-peak has a 4-second period and the square wave has an 8-second period. These two waveforms are orthogonal because their frequency spectra are non-overlapping. The tri-peak waveform has the spectrum ¼ Hz, ²/₄ Hz, ⁷/₄ Hz, ¹⁰/₄ Hz, etc. The square wave has a spectrum ⅛ Hz, ⅜ Hz, ⅝ Hz, etc. The resulting earth responses can be separated in the data by Fourier analysis when the data are binned on an 8-second interval.

Figure 13A:
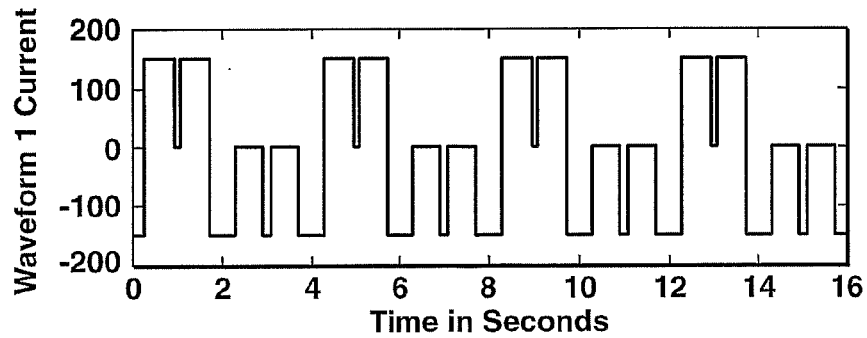
FIGS. 13A-B show an example of two non-sinusoid waveforms that are phase-encoded to make them orthogonal.
Figure 13B:
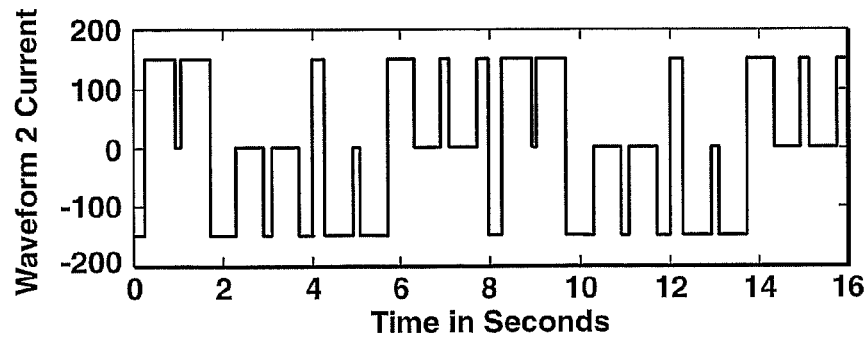
Figure 14:
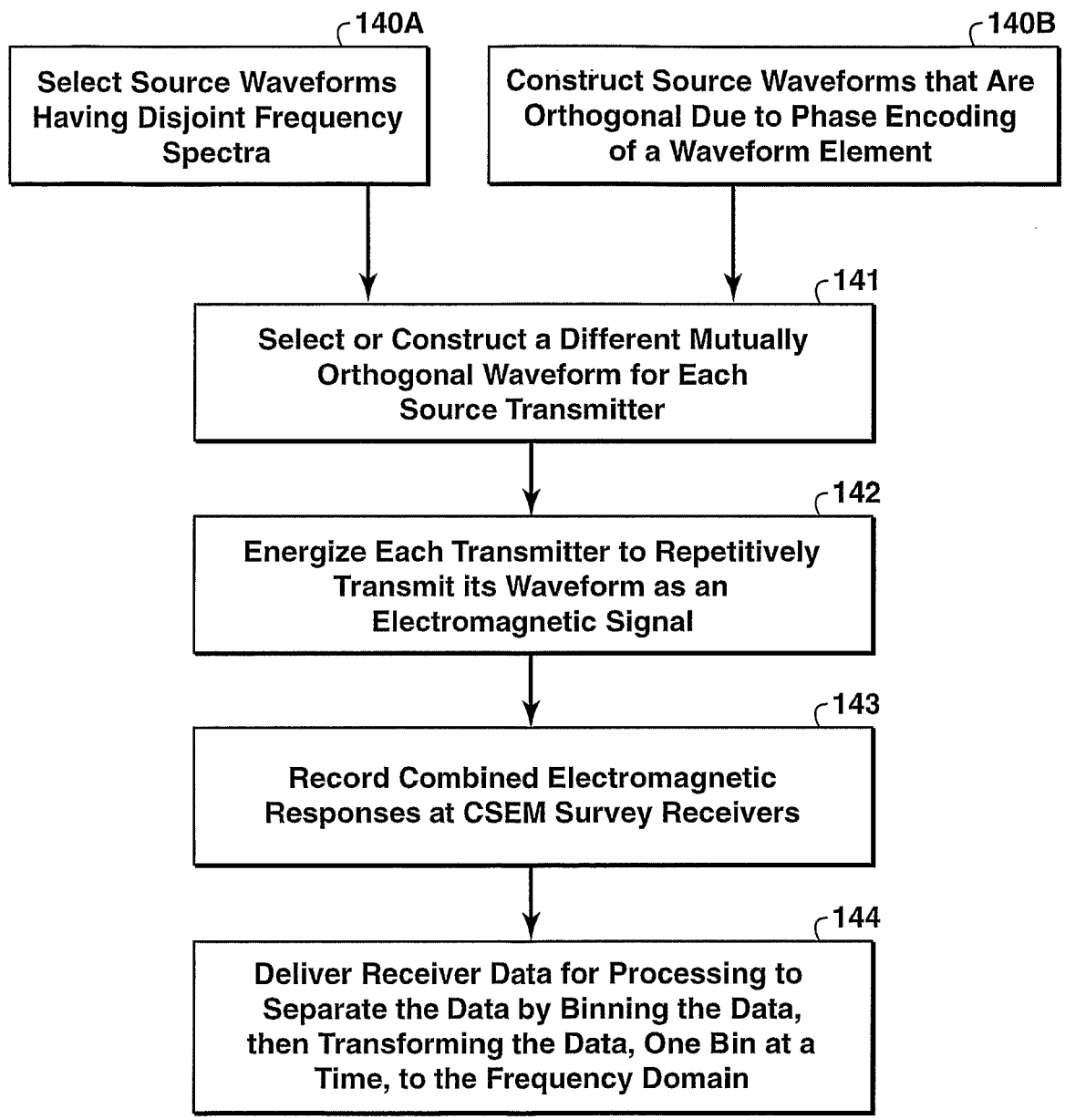
FIG. 14 is a flowchart showing basic steps of the present inventive method.

FIGS. 13A and 13B show two more complicated waveform sets in which the individual waveforms have been phase-encoded to achieve orthogonality. Although the base waveforms are the same (4-second tri-peak), the waveform sets are orthogonal on a period of 8 seconds and can be separated by spectral decomposition on an 8-second bin.

The present invention is about separating the data measured in response to multiple, simultaneous electromagnetic sources. Practical problems that must be overcome in deploying more than one transmitter at the same time are not within the scope of the present invention, but some of these issues are nevertheless briefly addressed as follows:

Complex transmitter waveforms, such as the tripeak and quadpeak have a rich harmonic structure containing many harmonics (multiples of 1/T). For example, the tripeak waveform shown in FIG. 6 has a 40$^{th}$ harmonic (frequency=40/T) whose amplitude is about ¹/₁₅ as strong as the harmonics at 1/T, 2/T, and 4/T. Since electromagnetic signals decay as they propagate in the earth and higher frequencies decay very rapidly because of the skin depth effect, it can be very difficult to identify signals associated with higher harmonics. For purposes of creating approximately orthogonal waveform sets and as a preferred embodiment, frequencies whose theoretical or measured amplitudes are less than some cutoff or threshold (for example, 0.05 times the peak amplitudes of the waveform) may be ignored.

Figure 5:
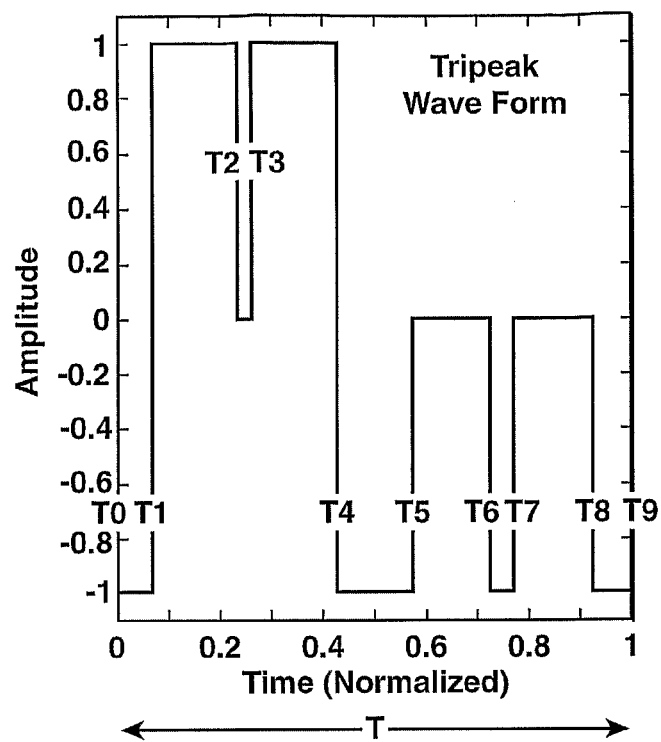
FIG. 5 shows the tri-peak waveform.
Figure 6:
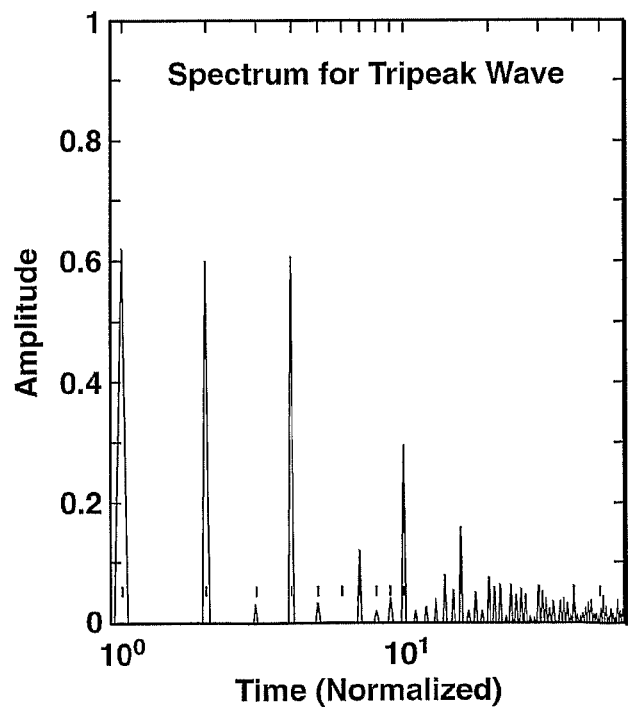
FIG. 6 shows the tri-peak waveform's frequency spectrum.
Figure 7:
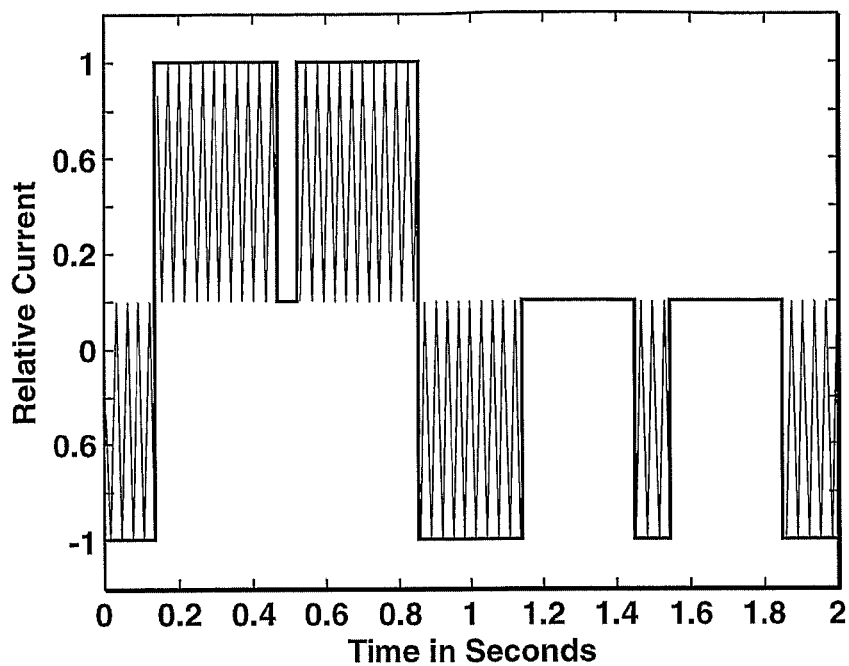
FIG. 7 shows how a tri-peak waveform may be constructed using a 16 Hz carrier wave.

Real transmitters are imperfect and their spectra differ from the mathematical idealizations depicted in FIGS. 5, 6, and 7. Real transmitters, for example, do not switch their carrier cycles instantaneously as depicted in FIG. 7. This causes the spectral content of the waveform to deviate from the mathematical ideal. Again, for purposes of imposing approximate orthogonality on the waveform sets, it is preferable to use measured spectra whenever possible as well as to ignore frequencies whose amplitudes are less than 0.05 (or some other cutoff) times the peak waveform amplitude.

In the case where a transmitter is moving, the waveforms within a waveform set actually correspond to different transmitter positions. This movement, in turn, decreases the spatial resolution of the data as it is binned over a longer time interval. In the extreme situation of a very long waveform set, the data may be averaged over too large a spatial area to be of value. For these reasons, antenna speeds are preferably kept at less than about 2 knots (about 1 m/s) and waveform sets are preferably limited in duration to, for example, 96 seconds or less. These constraints are still relaxed enough to permit the use of the present invention (i.e., multiple transmitters transmitting multiple waveform sets) to probe the commonly used frequencies of between ¹/₃₂ and ½ seconds.

There are unique risks to equipment and to subsea infrastructure ("hazards") associated with moving multiple CSEM transmitters through the water. Whether the transmitters are deployed from one or multiple vessels, to minimize the risk of entanglement, it is preferable to maintain a physical separation between any two transmitters equal to at least the length of the longest electrode. For typical 300-meter transmitter antennae, the longest electrode might be 320 meters, with a corresponding minimum physical separation. In some configurations, such as vertically-separated antennae, the minimum separation might be smaller.

Each transmitter antenna will act as a receiver and therefore will pick up signal generated by the other antennae. This effect is very location dependent, as the dominant signal path could be through the water, through the earth, or, in shallow water, through the atmosphere. It is further complicated by the variation in signal strength with frequency and by the uncertain ability of the transmitter hardware to maintain a stable waveform in the presence of this signal. Where pick-up is a concern, it is preferable to restrict the separation between two antennae to be more than the maximum projection of either longest electrode along the line defined by the other antenna. In general, this is a less severe constraint than the hazard criterion of the last paragraph and only approaches the hazard criterion when the antennae are parallel.

The invention is suitable for use with transmitter antennae whose positions are controlled by any means, whether moving or stationary. This includes the use of paravanes, barovanes, winches, cables, derricks, and pulleys to control multiple seismic sources and receivers. See, for example, Sheriff, Robert, E., *Encyclopedic Dictionary of Applied Geophysics*, Society of Exploration Geophysicists, 4th edition (2002); and U.S. Pat. No. 4,798,156 to Langeland, et al. (1989).

Figure 11A:
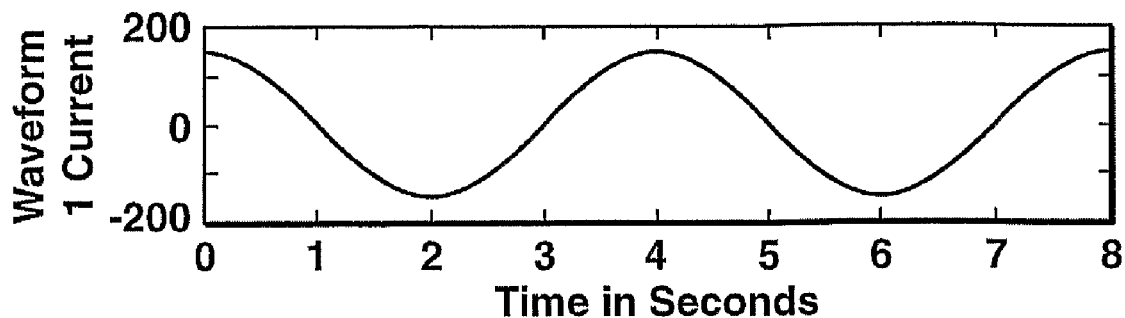
FIGS. 11A-C show an example of three mutually orthogonal waveforms that rely on a combination of disjoint spectra and phase encoding for their mutual orthogonality.
Figure 11B:
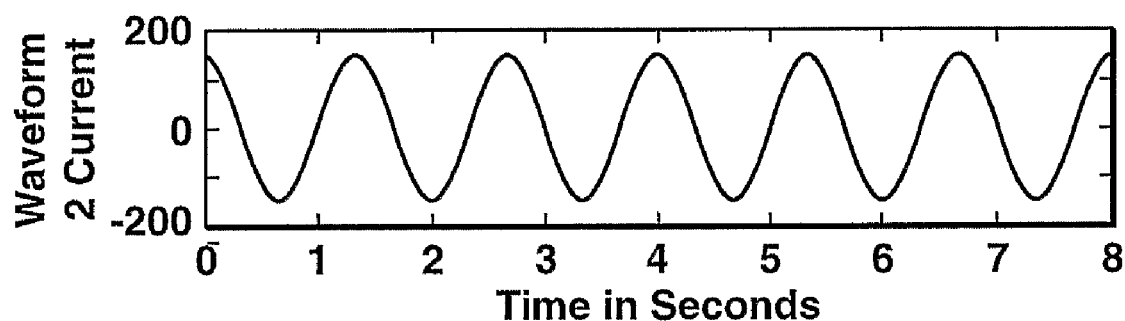
Figure 11C:
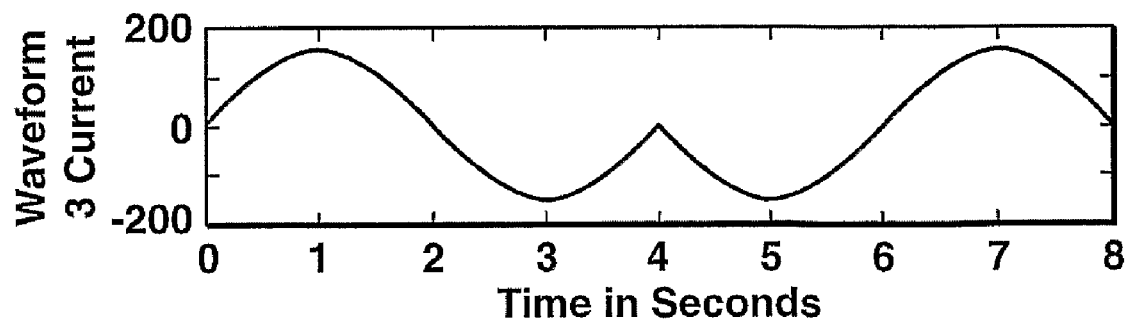

It will be seen from the preceding observations that the present invention's requirement for mutual orthogonality of the waveforms is to be interpreted as meaning substantial orthogonality, both because perfect orthogonality cannot be realized in practice and because it is not needed for the invention to work satisfactorily anyhow. The present invention can be readily practiced by anyone skilled in the art of CSEM data acquisition and processing. The methods needed to synchronize clocks associated with multiple receivers and transmitters do not differ from those methods used to acquire and process data from a single transmitter. Furthermore, one skilled in these methods will recognize that the invention is suitable for use:

with transmitter antennae deployed from multiple surface vessels, including scenarios where one or more vessels or antennae are stationary during transmission and where one or more vessels or antennae are moving during transmission;

with transmitter waveforms created by any means, including switching and rectification;

with three or more orthogonal waveforms in order to use more than two transmitters (as shown in FIG. 11);

with any combination of electric or magnetic transmitter antennae; and, in conjunction with other CSEM acquisition and processing techniques.

The foregoing application is directed to particular embodiments of the present invention for the purpose of illustrating it. It will be apparent, however, to one skilled in the art, that many modifications and variations to the embodiments described herein are possible. For example, although the preceding description uses examples where the invention is applied in a marine environment, this is not a restriction on the invention. Persons skilled in the art will readily understand that the invention has equal applicability to electromagnetic surveys performed on land. All such modifications and variations are intended to be within the scope of the present invention, as defined in the appended claims.

The invention claimed is:

1. A method for performing a controlled source electromagnetic survey of a subterranean region using two or more electromagnetic transmitters such that the combined responses at a receiver can be separated according to the electromagnetic transmitter, comprising:

(a) selecting or constructing N mutually orthogonal waveforms, one for each of the N electromagnetic transmitters, where N=2 or more. wherein waveform mutual orthogonality is based on one of the following or a combination of both:

(i) waveforms are chosen that have no common frequencies with non-negligible associated amplitudes in their frequency spectra, using a predetermined criterion for negligible;

(ii) waveforms are constructed from repetition of a selected waveform element with one or more predetermined phase shifts applied to the selected element, said phase shifts being chosen such that when combined data are binned on a selected time interval then transformed bin-by bin to the frequency domain, data from each of the electromagnetic transmitters can be separated by virtue of the phase shifts, said selected bin time interval being a selected integer multiple of the waveform element's duration wherein said selected integer is two or greater;

(b) energizing each of the electromagnetic transmitters to repetitively transmit its waveform, all of the electromagnetic transmitters transmitting at the same time;

(c) recording a combined electromagnetic response to the multiple concurrent transmissions at one or more receivers; and (d) delivering the recorded combined response data for processing to separate the data by binning the data on a predetermined time interval and then transforming the data, bin-by bin, to the frequency domain, the bin time interval being determined by said waveforms' periodicities.

2. The method of claim 1, wherein the data are transformed to the frequency domain by Fourier transformation.

3. The method of claim 1, wherein the data are transformed to the frequency domain by a data fitting technique.

4. The method of claim 3, wherein the data fitting technique is by least squares.

5. The method of claim 1, wherein the N waveforms are the same periodic waveform except that they have N different frequencies, all N periods having a common integer multiple, wherein period is the reciprocal of frequency.

6. The method of claim 5, wherein the same periodic waveform is a sinusoid.

7. The method of claim 5, wherein the same periodic waveform is a square wave.

8. The method of claim 1, further comprising placing a receiver near each of the electromagnetic transmitters and measuring and recording the electromagnetic transmitter's actual signal, and delivering the recorded actual signals along with the combined response data in order that separated responses may be extracted from the combined response using the measured actual signals.

9. A method for performing a controlled source electromagnetic survey of a subterranean region using two or more electromagnetic transmitters such that the combined responses at a receiver can be separated according to the electromagnetic transmitter, comprising:

(a) selecting or constructing N mutually orthogonal waveforms, one for each of the N electromagnetic transmitters, where N=2 or more, wherein waveform mutual orthogonality is based on one of the following or a combination of both:

(i) waveforms are chosen that have no common frequencies with non-negligible associated amplitudes in their frequency spectra, using a predetermined criterion for negligible;

(ii) waveforms are constructed from repetition of a selected waveform element with one or more predetermined phase shifts applied to the selected element, said phase shifts being chosen such that when combined data are binned on a selected time interval then transformed bin-by bin to the frequency domain, data from each of the electromagnetic transmitters can be separated by virtue of the phase shifts, said selected bin time interval being a selected integer multiple of the waveform element's duration wherein said selected integer is two or greater;

(b) energizing each of the electromagnetic transmitters to repetitively transmit its waveform, all of the electromagnetic transmitters transmitting at the same time;

(c) recording a combined electromagnetic response to the multiple concurrent transmissions at one or more receivers; and (d) separating the data by binning the data on a predetermined time interval and then transforming the data, bin-by bin, to the frequency domain, the bin time interval being determined by said waveforms' periodicities.

10. The method of claim 9, wherein the data are transformed to the frequency domain by Fourier transformation.

11. The method of claim 9, wherein the data are transformed to the frequency domain by a data fitting technique.

12. The method of claim 11, wherein the data fitting technique is by least squares.

13. The method of claim 9, wherein the N waveforms are the same periodic waveform except that they have N different frequencies, all N periods (reciprocal of frequency) having a common integer multiple.

14. The method of claim 13, wherein the same periodic waveform is a sinusoid.

15. The method of claim 13, wherein the same periodic waveform is a square wave.

16. The method of claim 9, further comprising placing a receiver near each of the electromagnetic transmitters and measuring and recording the electromagnetic transmitter's actual signal, and delivering the recorded actual signals along with the combined response data in order that separated responses may be extracted from the combined response using the measured actual signals.

17. A method for producing hydrocarbons from a subterranean region, comprising the steps of:

(a) performing a controlled-source electromagnetic survey of the subterranean region, wherein two or more electromagnetic transmitters are used such that the combined responses at a receiver can be separated according to transmitter, by a method comprising:

(i) selecting or constructing N mutually orthogonal waveforms, one for each of the N electromagnetic transmitters, where N=2 or more, wherein waveform mutual orthogonality is based on one of the following or a combination of both:

waveforms are chosen that have no common frequencies with non-negligible associated amplitudes in their frequency spectra, using a predetermined criterion for negligible;

waveforms are constructed from repetition of a selected waveform element with one or more predetermined phase shifts applied to the selected element, said phase shifts being chosen such that when combined data are binned on a selected time interval then transformed bin-by bin to the frequency domain, data from each of the electromagnetic transmitters can be separated by virtue of the phase shifts, said selected bin time interval being a selected integer multiple of the waveform element's duration wherein said selected integer is two or greater;

(ii) energizing each of the electromagnetic transmitters to repetitively transmit its waveform, all of the electromagnetic transmitters transmitting at the same time;

(iii) recording a combined electromagnetic response to the multiple concurrent transmissions at one or more receivers; and (iv) delivering the recorded combined response data for processing to separate the data by binning the data on a predetermined time interval and then transforming the data, bin-by bin, to the frequency domain, the bin time interval being determined by said waveforms' periodicities; and (b) obtaining processed data for the survey, and identifying at least one hydrocarbon accumulation in the subterranean region using the processed survey data; and (c) drilling a well and producing hydrocarbons from an identified hydrocarbon accumulation.

* * * * *